United States Patent [19]
Miller

[11] Patent Number: 5,152,347
[45] Date of Patent: Oct. 6, 1992

[54] INTERFACE SYSTEM FOR A TOWED IMPLEMENT

[75] Inventor: Matthew T. Miller, Waterloo, Iowa
[73] Assignee: Deere & Company, Moline, Ill.
[21] Appl. No.: 681,023
[22] Filed: Apr. 5, 1991
[51] Int. Cl.$^5$ ............................................. A01B 63/00
[52] U.S. Cl. .................................... 172/7; 172/316; 172/328
[58] Field of Search .................... 172/7, 9, 239, 315, 172/316, 413, 465, 491, 663, 668

[56] References Cited

U.S. PATENT DOCUMENTS

| | | | |
|---|---|---|---|
| 2,974,733 | 3/1961 | Fletcher | 172/315 X |
| 3,463,510 | 8/1969 | Van Sipe | 172/7 |
| 3,517,943 | 6/1970 | Bunting et al. | 172/7 X |
| 3,627,053 | 12/1971 | Hook et al. | 172/316 X |
| 3,630,290 | 12/1971 | Williams et al. | 172/316 X |
| 3,753,467 | 8/1973 | Wilson | 172/3 |
| 3,791,454 | 2/1974 | Koch et al. | 172/7 |
| 4,231,432 | 11/1980 | Jennings | 172/7 |
| 4,637,474 | 1/1987 | Leonard | 172/7 |
| 4,817,730 | 4/1989 | Winter | 172/328 |

Primary Examiner—Dennis L. Taylor
Assistant Examiner—Jeffrey L. Thompson

[57] ABSTRACT

A towed implement with an implement cylinder may be coupled to the hitch of a tractor which includes a hydraulic pump, a hydraulic sump, a rockshaft cylinder for raising and lowering the hitch, a hitch control valve for controlling fluid flow to the rockshaft cylinder, a control unit for controlling the hitch control valve as a function of a sensed parameter signal and an operator generated command signal. A two-position, four-way selector valve selectively connects the hitch control valve to the implement cylinder and operates to automatically raise the hitch to its top position when the selector valve connects the hitch control valve to the implement cylinder. A manually operated four position, four-way selective control valve is connected between the selector valve and the implement cylinder and a towed implement position sensor is connected to the electronic control unit of the tractor hitch control system.

10 Claims, 1 Drawing Sheet

INTERFACE SYSTEM FOR A TOWED IMPLEMENT

BACKGROUND OF THE INVENTION

The present invention relates generally to a tractor-towed implement arrangement, and more particularly to an improved interface system for connecting the hydraulic lift cylinder of a towed implement to a tractor hitch control system.

As shown in U.S. Pat. No. 4,518,044 issued 21 May, 1985 to Wiegardt et al., hitch control systems for controlling tractor hitch mechanisms are well known. Typically, an implement such as a plow is integrally coupled to the hitch draft links so that variations in hitch position and/or draft force are sensed by an electronic control unit. The control unit, in turn, supplies control signals to a hitch control valve which controls fluid flow to a hitch cylinder which adjusts the vertical position of the hitch in response to the changes in the sensed position or sensed draft force. As shown in U.S. Pat. No. 3,627,053 issued 14 Dec., 1971 to Hook et al., a hydromechanical system is known wherein the hitch control valve and a selector valve controls a remote cylinder of a towed implement. Another hydromechanical control system for a hitch cylinder and a towed implement cylinder is shown in U.S. Pat. No. 2,974,733 issued 14 Mar. 1961 to Fletcher. However, with these prior art systems the operator may have to first undertake to raise the hitch to its extreme top position to ensure that the hitch does not interfere with the tongue of the towed implement. Also, these earlier systems do not easily provide for non-closed loop control of the remote cylinder independent of the hitch control valve.

SUMMARY OF THE INVENTION

An object of the present invention is to provide an improved interface system for connecting the hydraulic lift cylinder of a towed implement to a tractor hitch control system.

Another object of the present invention is to provide such an improved interface system wherein the hitch is automatically raised to its extreme top position whenever closed loop control of the towed implement cylinder is selected to ensure that the hitch does not interfere with the tongue of the towed implement.

Another object of the present invention is to provide such an improved interface system wherein the towed implement cylinder can be controlled independently of the hitch control valve.

These and other objects are achieved by the present invention wherein a manually operated two-position, four-way selector valve has one inlet connected to the system pump, another inlet connected to an outlet of the hitch control valve, a first outlet connected to an inlet of a manually operated selective control valve and a second outlet connected to the rockshaft cylinder. In one position the selector valve connects the pump to the inlet of the selective control valve and connects the outlet of the hitch control valve to the rock shaft cylinder. In its other position the selector valve connects the pump to the rock shaft cylinder and connects the outlet of the hitch control valve to the inlet of the selective control valve. A potentiometer-type implement position sensor is mounted on the towed implement to provide a implement position feedback signal. The electronic control unit senses when implement position sensor is connected to the control unit and automatically uses the signal from the implement position sensor in place of the hitch position signal from the hitch position sensor.

DESCRIPTION OF THE PREFERRED EMBODIMENT

Figure 1:
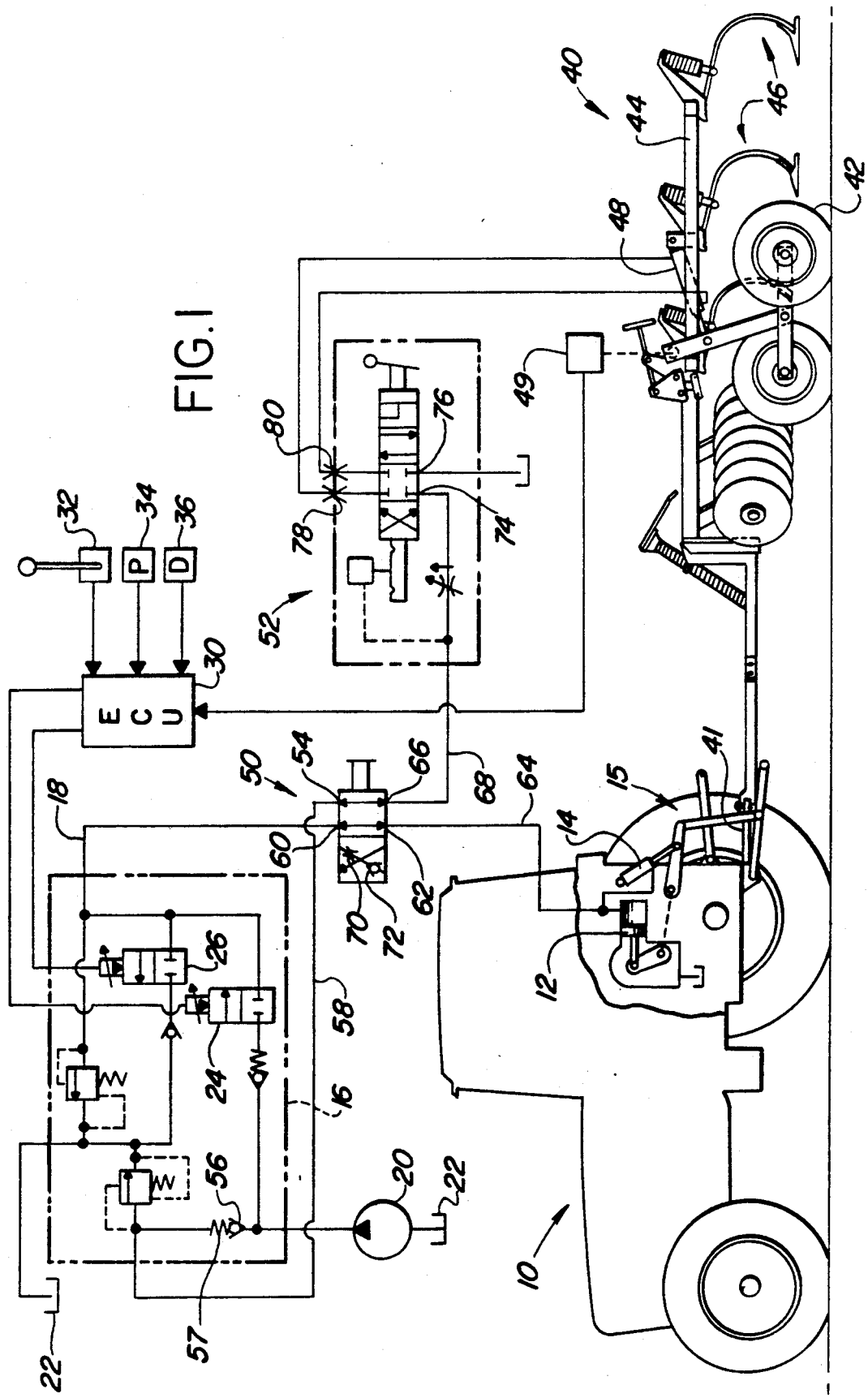
FIG. 1 is a schematic view of an interface system according to the present invention.

A hitch control system for an agricultural tractor, which is schematically indicated at 10, includes a rockshaft cylinder 12 and an assist cylinder 14 which raise and lower a conventional integral implement (not shown) connected to a conventional 3-point hitch 15. A conventional electrohydraulic hitch control valve 16 controls fluid communication between an output line 18, a pump 20, and a reservoir or sump 22. The hitch control valve 16 includes a solenoid-operated pressure control valve 24 and a solenoid-operated return control valve 26. The valves 24 and 26 are controlled by control signals generated by an electronic control unit (ECU) 30. As described in U.S. Pat. No. 4,979,092, the ECU 30 generates control signals as a function of input signals generated by an operator-controlled control lever transducer 32, a hitch position sensor 34 and a draft force sensor 36.

A conventional towed implement 40 may be towed from the conventional drawbar 41 of the tractor. The towed implement 40 typically includes a plurality of transport wheels 42, a frame 44 adjustably supported on the wheels 42 and which carries a ground engaging implement or tool 46, and at one or more double-acting implement cylinders 48 which can adjust the position of the tool 46 relative to the wheels 42. An implement position sensor 49, such as a commercially available rotary potentiometer, is mounted on the towed implement 40 to sense the position of the frame 44 and tool relative to the wheels 42.

According to the present invention, a manually operated selector valve 50 and a manually operated selective control valve (SCV) 52 are connected between the hitch control valve 16 and the cylinders 12, 14 and 48 so that the ECU 30 and the hitch control valve 16 can be selectively used to control either the rockshaft cylinder 12 or the remote implement cylinder 48.

The selector valve 50 is a two-position, four-way valve with a first port 54 connected to the pump 20 via line 58 and via a check valve 56 and fluid restriction 57 (which are part of the hitch control valve 16). A second port 60 is connected to the outlet line 18 and thus, to the work port or controlled pressure outlet of hitch control valve 16. A third port 62 is communicated to the cylinders 12 and 14 via line 64 and a fourth port 66 is communicated to a pressure port of the SCV 52 via line 68. The selector valve 50 has a first position wherein pump pressure in port 54 is communicated to port 66 and wherein the controlled pressure (from valve 16) at port 60 is communicated to port 62. The selector valve 50 has a second position wherein pump pressure in port 54 is communicated to port 62 via internal restriction 70 and check valve 72 and wherein the controlled pressure (from valve 16) at port 60 is communicated to port 66.

The SCV 52 is a standard, well known 4-way, 4-position detent held valve, such as the selective control valve which has been manufactured and used for years on production John Deere tractors. The SCV 52 has a pressure port 74 which is connected to port 66 of the selector valve 50, and a sump port 76 which is connected to the sump 22. The SCV 52 has outlets 78 and 80 which are connected to the two ports of the implement cylinder 48.

The operation of the above-described system is as follows:

When no towed implement is to be pulled by the tractor 10 the selector valve 50 will be in the illustrated position. In this position the rockshaft cylinder 12 is connected to the hitch control valve 16 and the hitch 15 will be controlled in the known manner as a function of the operator control 32, the hitch position sensor 34 and the draft force sensor 36. At the same time, the SCV 52 is connected to the pump pressure from pump 20 via lines 58 and 68 so that the SCV can be used to control any hydraulic function which may be connected to it, such as cylinder 48.

When the towed implement 40 is to be pulled by the tractor 10 the implement cylinders 48 on the towed implement 40 are connected to SCV 52 via its hydraulic couplers. If it is desired to control the implement cylinders 48 in a feedback position control mode, then the selector valve 50 is manually moved to its second position and an implement position sensor 49 is connected to the ECU 30 in place of the hitch position sensor 34. In this second position the selector valve 50 connects the rockshaft cylinder 12 to the pump 20 and the hitch 15 will automatically be raised to its fully raised position so that it will not interfere with the towed implement 40. The restriction 70 controls the rate at which the hitch will lift and the check valve 72 will hold the hitch in this raised position when hydraulic system pressure from pump 20 is less than hitch load pressure. At the same time, pressure port 74 of the SCV 52 is connected to the controlled pressure from work port of hitch control valve 16 via lines 18 and 68. If the SCV 52 is moved to its detent-held "raise" position, the implement cylinder 48 will be controlled by the ECU 30 and the hitch control valve 16 as a function of the operator control 32 and the implement position sensor 49.

If it is desired to control the implement cylinder 48 in an "actuation mode", the control lever 32 is moved to its fully raised position so that maximum pressure is applied to pressure port 74 of the SCV 52. With SCV 52 in its lower position, the direction of flow to the implement cylinder 48 will be reversed. This will power the wheels 42 off of the ground and lower the tool 46. The tool 46 can be raised by moving the SCV 52 to its raised position.

With this system, dual acting cylinder operation is retained and the hydraulic attachment to the implement is identical to that required for normal SCV control of the implement cylinder and no hydraulic re-connections are required.

While preferred embodiments of the invention have been illustrated and described, it will be apparent to those skilled in the art that variations and modifications there of can be made without departing from the underlying principles of the invention. For example, the present invention can be utilized in connection with any type of towed implement which has a tool which can be moved with respect to a frame of the implement. Also, the towed implement cylinder could be controlled as a function of sensed draft force with the addition of draft force sensor which senses draft forces applied to the drawbar or if the towed implement is attached to a drawbar connector which is attached to the tractor draft links. Also, the towed implement cylinder could be controlled as a function of sensed wheel slip or as a function of various combinations of sensed parameters with the addition of sensors and a control unit as described in U.S. Pat. No. 4,518,044.

I claim:

1. In a tractor/towed implement combination having a tractor hitch, a hydraulic pump, a hydraulic sump, a rockshaft cylinder for raising and lowering the hitch, a hitch control valve for controlling fluid flow to the rockshaft cylinder, the hitch control valve having a variable pressure outlet, a control unit for controlling the hitch control valve as a function of a sensed parameter signal and an operator generated command signal, an implement cylinder for raising and lowering a tool of the towed implement and a selector valve for selectively connecting the variable pressure outlet of the hitch control valve to the implement cylinder, characterized by:

means for automatically raising the hitch to a position where it will not interfere with the towed implement when the selector valve connects the variable pressure outlet of the hitch control valve to the implement cylinder.

2. The invention of claim 1, wherein:

the selector valve comprising a two-position, four-way valve having a first inlet connected to the pump, a second inlet connected to an outlet of the hitch control valve, a first outlet for connecting to the implement cylinder, a second outlet connected to the rockshaft cylinder, and a manually movable valve member having a first position wherein the pump is communicated with the first outlet and the second inlet is communicated with the rock shaft cylinder, and having a second position wherein the pump is communicated to the rock shaft cylinder and the second inlet is communicated with the first outlet.

3. The invention of claim 2, wherein:

a check valve permits one way fluid flow from the pump to the rock shaft cylinder when the manually movable valve member is in its second position.

4. The invention of claim 3, wherein:

a fluid restriction restricts fluid flow from the pump to the rock shaft cylinder when the manually movable valve member is in its second position.

5. The invention of claim 2, wherein:

a selective control valve is connected between the first outlet of the selector valve and the implement cylinder.

6. The invention of claim 5, wherein:

the selective control valve comprises a four position, four-way valve having a first port communicated with the first outlet of the selector valve, a second port communicated with the sump, a third port communicated with one port of the implement cylinder, and a fourth port communicated with another port of the implement cylinder.

7. The invention of claim 1, further comprising:

a implement tool parameter sensor mounted on the towed implement for sensing a parameter associated with the tool; and means for communicating a signal from the implement tool parameter sensor to the control unit, the control unit controlling the implement cylinder as a function of the signal from the implement tool parameter sensor and the operator generated command signal.

8. In a tractor/towed implement combination having a tractor hitch, a hydraulic pump, a hydraulic sump, a rockshaft cylinder for raising and lowering the hitch, a hitch control valve for controlling fluid flow to the rockshaft cylinder, the hitch control valve having a variable pressure outlet, a control unit for controlling the hitch control valve as a function of a sensed parameter signal and an operator generated command signal, an implement cylinder for raising and lowering a tool of the towed implement and a selector valve for selectively connecting the variable pressure outlet of the hitch control valve to the implement cylinder, characterized by:

means for automatically raising the hitch to a position where it will not interfere with the towed implement when the selector valve connects the hitch control valve to the implement cylinder, the selector valve comprising a two-position, four-way valve having a first inlet connected to the pump, a second inlet connected to an outlet of the hitch control valve, a first outlet for connecting to the implement cylinder, a second outlet connected to the rockshaft cylinder, and a manually movable valve member having a first position wherein the pump is communicated with the first outlet and the second inlet is communicated with the rock shaft cylinder, and having a second position wherein the pump is communicated to the rock shaft cylinder and the second inlet is communicated with the first outlet.

9. A tractor/towed implement combination comprising:
- a tractor hitch;
- a hydraulic pump;
- a hydraulic sump;
- a rockshaft cylinder for raising and lowering the hitch;
- a hitch control valve having a variable pressure outlet;
- a control unit for controlling the hitch control valve as a function of a sensed parameter signal and an operator generated command signal;
- an implement cylinder for raising and lowering a tool of the towed implement; and
- a selector valve having a first port connected to the pump, a second port connected to the variable pressure outlet of the hitch control valve, a third port for communicating with the implement cylinder, a fourth port communicated with the rockshaft cylinder, and a valve member movable to a first position wherein the first port is communicated with the third port and the second port is communicated with the fourth port and the rock shaft cylinder, and to a second position wherein the first port and the pump are communicated with the rock shaft cylinder and the second port is communicated with the third port and the implement cylinder.

10. The invention of claim 9, wherein:
- a selective control valve is connected between the third port of the selector valve and the implement cylinder.

* * * * *